A. E. SMITH.
AUTOMOBILE TOP SLIDE.
APPLICATION FILED SEPT. 9, 1910.
1,048,106.
Patented Dec. 24, 1912.
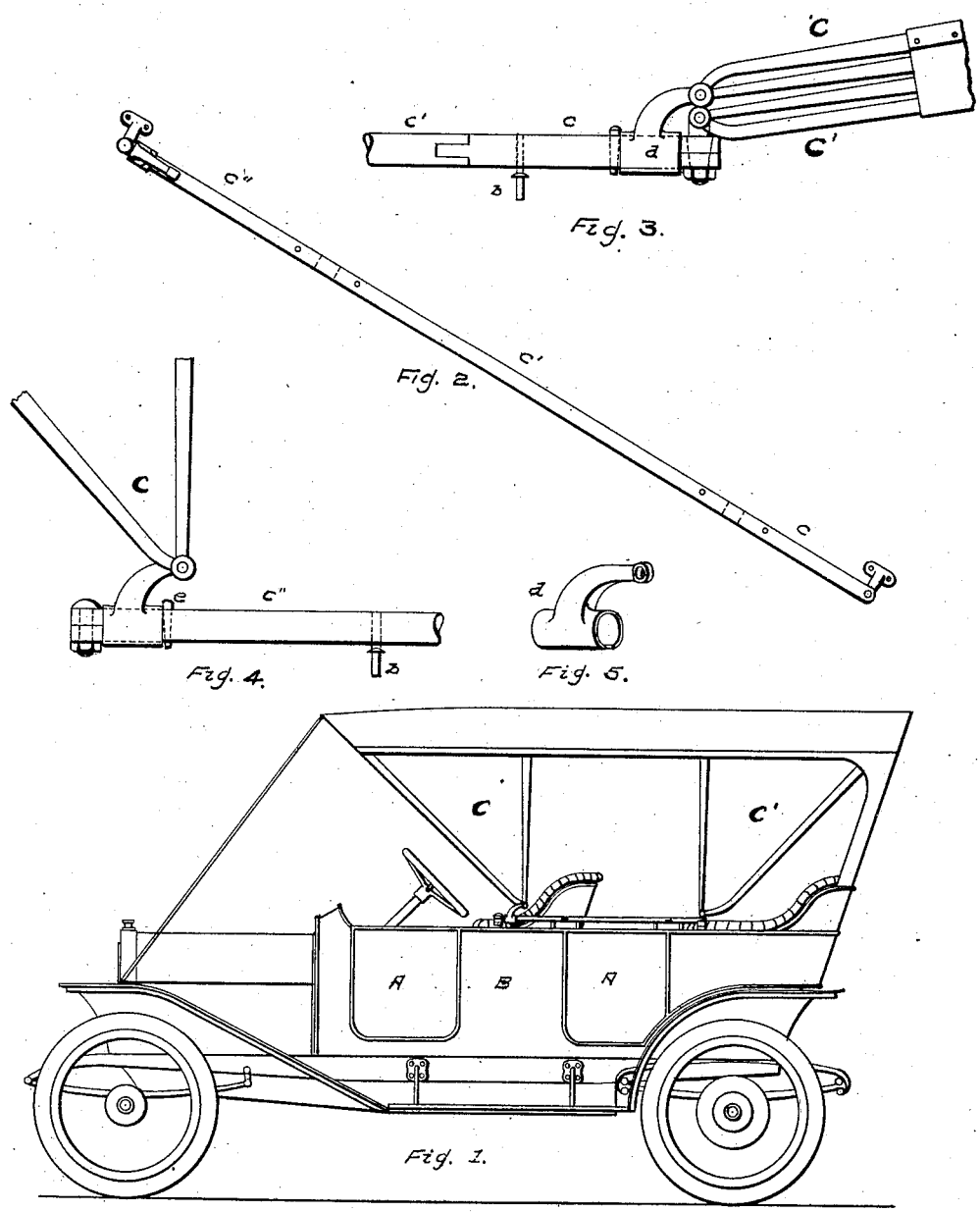

UNITED STATES PATENT OFFICE.

ALICE E. SMITH, OF ELYRIA, OHIO.

AUTOMOBILE-TOP SLIDE.

1,048,106. Specification of Letters Patent. Patented Dec. 24, 1912.

Application filed September 9, 1910. Serial No. 581,226.

*To all whom it may concern:*

Be it known that I, ALICE E. SMITH, a citizen of the United States, residing at Elyria, in the county of Lorain and State of Ohio, have invented a new and useful Slide for Automobile-Tops, of which the following is a specification.

My invention relates to improvements in a device or slide for carrying the lower ends of the bows to the front end section of the folding top of automobile back and forward to permit of the top being lowered and raised when desired, without having to carry same by manual force.

The object of my invention is to provide a means of carrying on rods the lower ends of the bows of the front section or part of the folding top of an automobile, backward or forward to permit said top being lowered or raised when desired by sliding the lower ends of the front bow section along said rods, also arranged to operate easily and not interfere with getting in or out of the automobile. I attain these objects by the mechanism illustrated in the accompanying drawings, in which—

Figure 1. shows my invention applied to an automobile. Fig. 2. shows a top view of the jointed separable rods connecting the lower ends of the bows of the front and back sections of the folding top of an automobile. Fig. 3. is an enlarged sectional view of the rear end of one of the rods with the slide in the position it takes when top is lowered. Fig. 4. is an enlarged sectional view of the front end of one of the rods with slide in position it takes when top is raised. Fig. 5. is an enlarged perspective view of the slide to which front end of one side of lower end of bows of forward section of top is attached.

Similar letters refer to similar parts throughout the several views.

A, represents the side door of an automobile body. B, the body of an automobile. C, the lower end of bows to front end section of the top, and C', the lower end of bows of back section.

Connecting the lower ends of bow sections C and C' on each side of an automobile are small rods of suitable size and each side rod is divided into three sections, the rear section c is attached rigidly to the lower ends of the back bows as shown in Fig. 3 or in any other suitable manner, the front end of said section is supported by a suitable brace b, secured to the body of the automobile in any suitable manner, the front end of the rear section of the rod may be provided with a tenon or other suitable interlocking device for uniting or connecting same with the middle section of rod c', which is secured to the door of the automobile by braces and in line, when the door is closed, with the back and front sections and also provided with interlocking device for connecting the rear and front ends with the back and front sections of said rod. The front section c'' of said rod is rigidly secured to that part of the automobile supporting the lower ends of the front bows and the rear ends of said section of rod also supported by suitable braces attached to the automobile body. A suitable slide d is provided to slide along this separable rod, which slide has an upwardly projecting arm to which is pivotally attached the lower front end of the top bows and the lower side of said slides are cut open lengthwise to permit of the same passing each side of the braces b when sliding along said rod. Suitable holes e, may be provided in said rod at any point with pins for insertion therein to hold said slide d at any desired point as shown in Fig. 4.

The operation of my invention is as follows, to wit:—One of the sectional rods is secured to each side of the body of an automobile as heretofore explained with the slides engaging same with the lower ends of the front bows attached to the upwardly projecting arms of the slides d and said slides held in place on the front ends of said sectional rods by pins or otherwise. In this position the front bows of the top are in position to hold the top up. When it is desired to lower the top, the door being shut, the slides d are drawn backward along the sectional rods on each side to the rear ends of the sectional rods, when said top can be easily folded back and dropped in the usual manner. When it is desired to raise the top, the slides d are pushed forward along said sectional rods to the front ends and said top raised in an upright position by any ordinary exertion. The side doors can be opened or closed for any purpose when the top is up or down in the ordinary way. When the back side door is opened, the central section of said rod disengages itself from the end sections and is carried out of the way by being secured to said door by said braces. When the door is shut, the sections are in line with each other and form a continuous rod for the slides, carrying the front top sections to run on.

Having fully described my invention and its operations what I claim as new and desire to secure by Letters Patent is:—

1. In a device of the character described, a body of an automobile, a door hinged to said body, a rod secured to said body, said rod being formed in sections, means slidably supporting the front bows of a folding top upon said rod, a section of said rod rigidly secured to said door so as to open therewith whereby passage to and from said body is unobstructed.

2. In a device of the character described, a body, a door hinged to said body, a rod secured to one side of said body, said rod formed in sections, one of said sections rigidly secured to said door and adapted to open therewith whereby the passage to and from said body is unobstructed, a sleeve slidable on said rod, an extension on said sleeve, the front bows of a folding top secured to said extension, the back bows of said folding top secured to said rod, and a pin adapted to be inserted through said rod whereby said sleeve may be held at certain positions along the same.

ALICE E. SMITH.

In the presence of—
W. H. VANOSTER,
MARGARET BANNON.

Copies of this patent may be obtained for five cents each, by addressing the "Commissioner of Patents Washington, D. C."